United States Patent
Edwards

(10) Patent No.: US 10,099,310 B1
(45) Date of Patent: Oct. 16, 2018

(54) WELDING TOOL

(71) Applicant: Keith Edwards, Cushing, OK (US)

(72) Inventor: Keith Edwards, Cushing, OK (US)

(*) Notice: Subject to any disclaimer, the term of this patent is extended or adjusted under 35 U.S.C. 154(b) by 249 days.

(21) Appl. No.: 14/942,702

(22) Filed: Nov. 16, 2015

Related U.S. Application Data

(60) Provisional application No. 62/079,859, filed on Nov. 14, 2014.

(51) Int. Cl.
  *B23P 15/00* (2006.01)
  *B23K 9/32* (2006.01)
  *B23K 5/22* (2006.01)

(52) U.S. Cl.
  CPC .............. *B23K 9/328* (2013.01); *B23K 5/22* (2013.01)

(58) Field of Classification Search
  CPC ........... B23P 15/00; B23P 15/40; B23P 15/46; B23P 19/02; B23P 19/04
  See application file for complete search history.

(56) References Cited

U.S. PATENT DOCUMENTS

| | | | | |
|---|---|---|---|---|
| 3,698,267 A | * | 10/1972 | Denney | B25B 13/105 269/266 |
| 5,320,004 A | * | 6/1994 | Hsiao | B25B 13/56 81/177.4 |
| D427,875 S | * | 7/2000 | Chiu | B25B 13/56 D8/105 |
| 6,601,481 B2 | * | 8/2003 | Chuang | B25B 13/56 7/168 |
| 7,726,637 B2 | * | 6/2010 | Stevenson | B23Q 3/06 269/254 CS |
| 8,387,492 B2 | * | 3/2013 | Liu | B25F 1/04 7/138 |
| 2009/0309284 A1 | * | 12/2009 | Dellach | B25B 1/2421 269/266 |
| 2010/0164160 A1 | * | 7/2010 | Stevenson | B23K 37/0435 269/279 |
| 2011/0173759 A1 | * | 7/2011 | Taiga | B25B 27/0071 7/118 |

* cited by examiner

Primary Examiner — Lee D Wilson
(74) Attorney, Agent, or Firm — Gable Gotwals

(57) ABSTRACT

A welding tool has a handle with a base end and an exit end. A bottom plate is affixed to the base end and preferably encloses the base end of the handle. A washer is affixed to the exit end of the handle. The washer defines an orifice and provides a surface for preventing a user's hand from slipping during use of the welding tool. A plurality of rods extends outwardly from the handle through the orifice. The rods are preferably affixed to the bottom plate at a base end and have a surface contacting end. The rods are sized to permit limited flexure, but to still be substantially rigid to effectively remove slag from a weld.

20 Claims, 2 Drawing Sheets

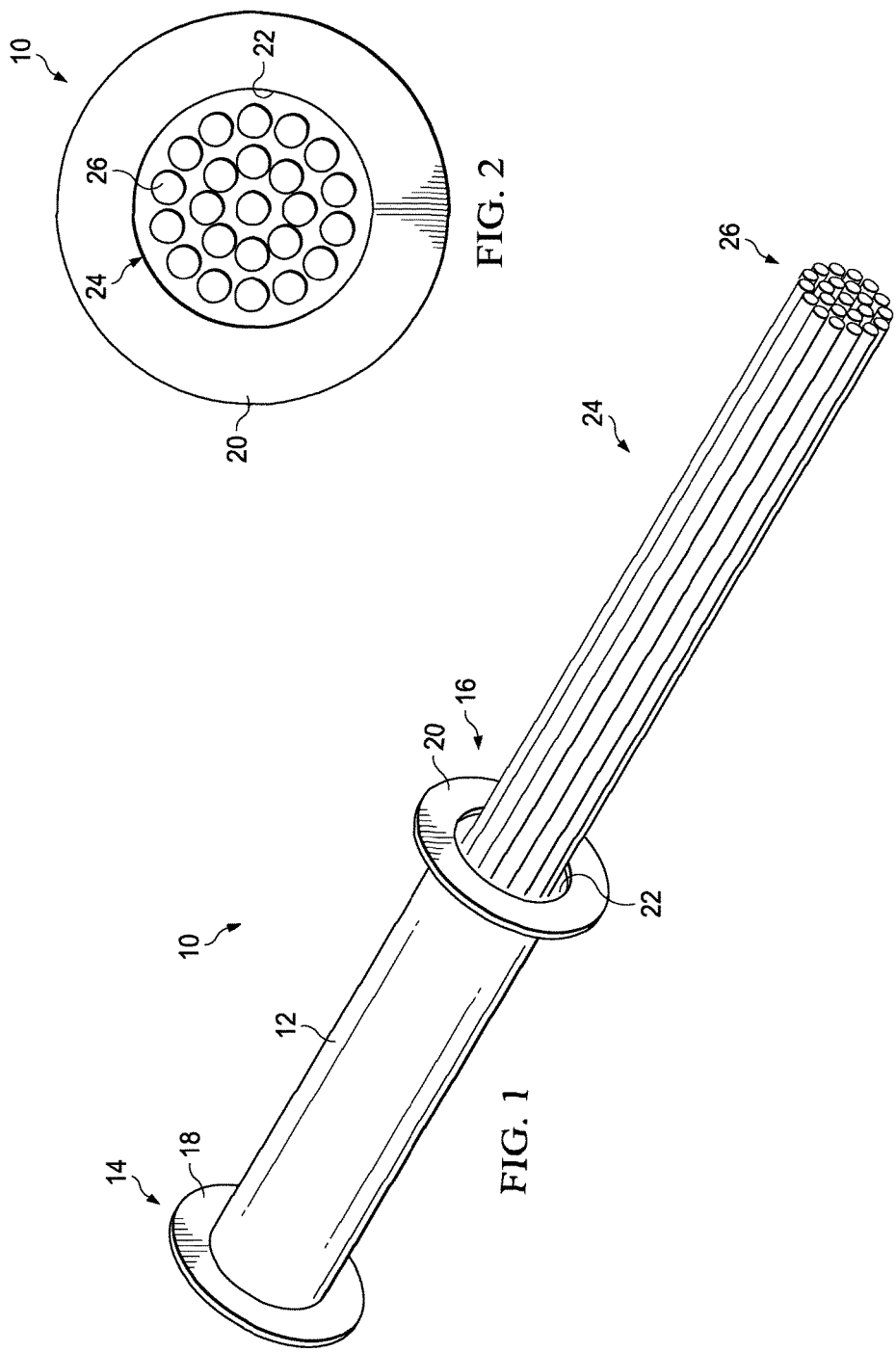

WELDING TOOL

CROSS REFERENCE TO RELATED APPLICATIONS

This application claims the priority of U.S. Provisional Patent Application No. 62/079,859 titled "WELDING TOOL," filed Nov. 14, 2014, the contents of which are hereby incorporated by reference.

FIELD OF THE INVENTION

The invention relates to a welding tool. In particular, the invention relates to an improved tool for removing slag from fresh welds. In greater detail, the welding tool of the invention assists a user in removing slag debris from welds in open and confined spaces more easily and efficiently.

BACKGROUND OF THE INVENTION

The American Welding Society lists many different welding processes. One type of welding is known as arc welding. Arc welding is a method of joining two or more materials with electrically generated heat. Shielded Metal Arc Welding (SMAW), also known as stick welding, is one of the most common and versatile forms of welding.

Equipment required for welding includes a welding machine, an electrode holder with lead, a ground clamp with lead, electrodes, and metal to be welded. A chipping hammer is used to remove the slag. Slag is a residue left from the welding process. During the weld, the slag protects the hot metal from contaminants. The slag covering does not cool at the same rate as the weld bead, which can cause the slag to pop off the weld. A chipping hammer is typically used to break the slag off the weld.

In use, a chipping hammer is used to tap the slag with just enough force to loosen the slag. Care must be taken when using the chipping hammer to avoid making hammer marks in the new weld. An example prior art chipping hammer has a cone-shaped nose with a sharp, flattened point and a beveled tail. A helical barrel spring handle may be used to isolate a user's hand from any heat that may be conducted by the handle.

A wire brush is typically used to clean the weld. The wire brush is used to remove excess particles, which is desirable if another pass is required.

SUMMARY OF THE INVENTION

A welding tool includes a handle having a base end and an exit end. A bottom plate is affixed to the base end of the handle. The bottom plate preferably encloses the base end of the handle. A washer is affixed to the exit end of the handle for keeping a user's hand from sliding off of the handle. The washer defines an orifice. A plurality of rods is affixed to the bottom plate. The rods extend though and out of the handle through the orifice of the washer.

By affixing the rods to the base end of the handle, the contact ends of the rods are a maximum distance from the attachment point, which allows the rods to bend or flex, even though the rods may be constructed of metal having a diameter of approximately ⅛". As a result, pings are minimized or avoided when the using the tool to clean slag off of a weld.

Advantages associated with using the tool of the invention include increased speed and thoroughness, and increased efficiency in cleaning of welds. The tool of the invention allows a user to clean spaces that are difficult to clean with a grinder or chipping hammer. The tool of the invention contours the match the surface to be cleaned and minimizes or eliminates indentations in the metal surface. Additionally, because the surface that is contoured with rods is covered by a plurality of rods, "slag rockets" that may result from impacts with a slag hammer or chipper are avoided.

BRIEF DESCRIPTION OF THE DRAWINGS

FIG. 1 is a side view of the welding tool of the invention;
FIG. 2 is an end view of the welding tool of the invention showing the contact ends of the rods.

DETAILED DESCRIPTION OF THE PREFERRED EMBODIMENTS

Figure 3:
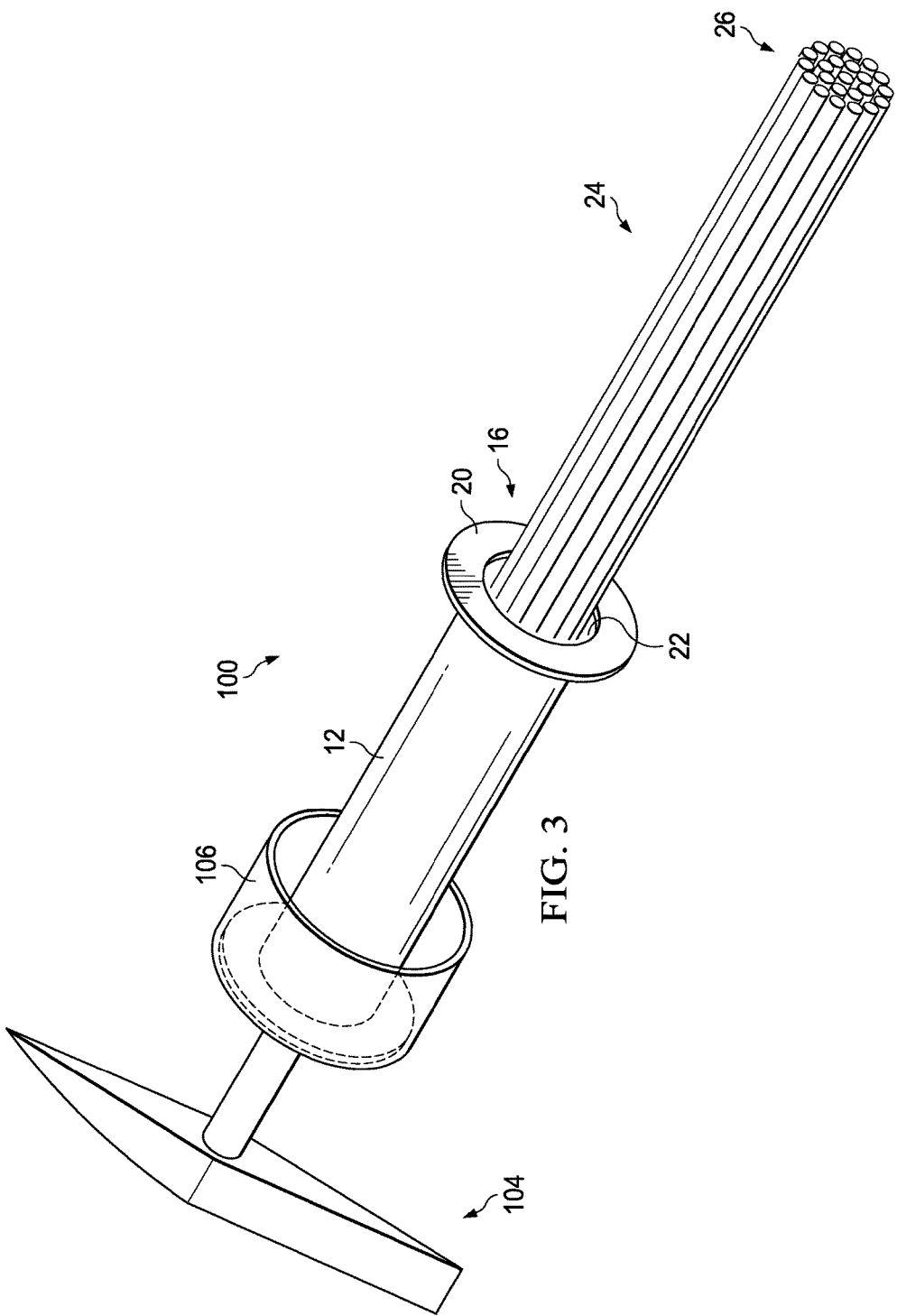
FIG. 3 is a side view of an alternate welding tool of the invention.

The welding tool of the invention, designated generally 10, includes handle 12. Handle 12 is preferably cylindrical, although other handle shapes may be utilized. In one embodiment, handle 12 is 1.25" O.D. pipe that is 5" in length. Handle 12 has base end 14 and exit end 16.

Bottom plate 18 is affixed to base end 14. Bottom plate 18 preferably encloses base end 14 of handle 12. In one embodiment, bottom plate 18 is replaced with a base cap that surrounds base end 14 of handle 12.

Washer 20 is affixed to exit 16 of handle 12. Washer 20 provides a surface for preventing a user's hand from slipping during use. An example washer 20 is 2.25"×⅛". Washer 20 defines orifice 22.

A plurality of rods 24 extend outwardly from handle 12 through orifice 22. Preferably, rods 24 are affixed to bottom plate 18. In one embodiment, twenty rods 24 having a dimension of 17.5" in length by ⅛" in diameter are affixed to bottom plate 18. Rods of other diameters, e.g., rods having a diameter from approximately ⅛" to 3/16" may also be used. Other numbers of rods may also be possible, e.g., 15 to 25 rods, 10 to 30 rods, 3 to 35 rods, or more. Rods 24 have a contact end 26. Rods 24 are preferably constructed of metal, such as 6010 electrodes, carbon steel, or stainless steel. A typical rod 24 may have a tensile strength of 60.00 psi. Rods 24 are sized to permit limited flexure, e.g., ¼" to ½", but to still be substantially rigid to effectively remove slag from a weld.

In an alternative embodiment, as shown in FIG. 3, an auxiliary tool 102 may be affixed to handle 12 of welding tool 100. For example, chipping hammer 104 may be affixed to bottom plate 18 or affixed to base cap 106 positioned over bottom plate 18 to increase versatility of the tool.

Welding tool 10 is used to remove slag from welds. Rods 24 have sufficient strength to knock slag off of a weld. By affixing rods 24 to bottom plate 18, contact end 26 of rods 24 are a sufficient distance away to allow some flexure or brush-like movement when used to strike slag. As a result, pings on the underlying weld are largely avoided, as compared to pings that are typically formed by use a chipping hammer.

In one embodiment, a slag hammer or chisel is added to the exterior of the base end of the handle.

In use, the welding tool of the invention is handled in a manner similar to a brush. The rods act as bristles, removing the slag from the weld, while flexing substantially to avoid pinging the welded surface.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A welding tool comprising:
a handle comprising a base end and an exit end;
a base cap that surrounds said base end, said base cap preferably enclosing said base end of said handle;
a washer affixed to said exit end of said handle, said washer defining an orifice, said washer for providing a surface for preventing a user's hand from slipping during use;
a plurality of rods extending outwardly from said handle through said orifice, said rods affixed to said base cap, said rods having a contact end, wherein said rods permit limited flexure, and are substantially rigid for effectively removing slag from a weld.

2. The welding tool of claim 1 wherein:
said handle is preferably cylindrical.

3. The welding tool of claim 1 wherein:
said rods comprise 10 to 30 rods.

4. The welding tool of claim 1 wherein:
said rods comprise 3 to 35 rods.

5. The welding tool of claim 1 wherein:
said rods comprise greater than 35 rods.

6. The welding tool of claim 1 wherein:
said rods are constructed of metal.

7. The welding tool of claim 1 wherein:
said base cap has a first side facing said handle and a second side facing away from said handle; and
further comprising an auxiliary tool affixed to said second side of said base cap.

8. A welding tool comprising:
a handle comprising a base end and an exit end;
a base cap affixed to said base end, said base cap surrounding said base end and enclosing said base end of said handle;
a washer affixed to said exit end of said handle, said washer defining an orifice;
a plurality of rods extending outwardly from said handle through said orifice, said rods having a contact end, wherein said rods permit limited flexure, and are substantially rigid for effectively removing slag from a weld.

9. The welding tool of claim 8 further comprising a surface adjacent said exit end of said handle, said surface extending outside of said handle for preventing a user's hand from slipping during use.

10. The welding tool of claim 9 wherein said surface is defined by said washer.

11. The welding tool of claim 8 wherein:
said rods extend from said exit end of said handle;
said base cap has a first side facing said handle and a second side facing away from said handle; and
further comprising an auxiliary tool affixed to said second side of said base cap.

12. The welding tool of claim 11 wherein said auxiliary tool is a chipping hammer.

13. The welding tool of claim 11 wherein:
said rods extend from said exit end of said handle; and
said auxiliary tool extends from said base end of said handle.

14. A welding tool comprising:
a first end and a second end;
a handle defining a base end and an exit end;
wherein said base end of said handle defines said first end of the tool;
a plurality of rods having a length and a contact end wherein a first portion of said length is inside said handle and a second portion of said length extends out of said exit end of said handle;
wherein said contact end of said rods define said second end of the tool.

15. The welding tool of claim 14 further comprising:
a closure member on said base end of said handle; and
wherein said plurality of rods are affixed to said closure member and extend through said handle for extending out of said exit end of said handle.

16. The welding tool of claim 15 wherein:
said closure member is a bottom plate.

17. The welding tool of claim 15 wherein:
said closure member is a base cap that surrounds said base end of said handle.

18. The welding tool of claim 14 wherein:
said exit end of said handle defines an exit area; and further comprising:
a restrictor provided on said exit end of said handle for restricting said exit area for reducing an area for said rods to pass through.

19. The welding tool of claim 14 further comprising:
an auxiliary tool extending away from said handle beyond said first end of the tool.

20. The welding tool of claim 19 wherein:
said auxiliary tool is a chipping hammer.

* * * * *